United States Patent Office 3,269,998
Patented August 30, 1966

3,269,998
MODIFIED ROSINS AND PROCESS
Jacob C. Minor, Walter H. Schuller, and Ray V. Lawrence, Lake City, Fla., assignors to the United States of America as represented by the Secretary of Agriculture
No Drawing. Filed Apr. 2, 1964, Ser. No. 356,989
9 Claims. (Cl. 260—99)

A nonexclusive, irrevocable, royalty-free license in the invention herein described, throughout the world for all purposes of the United States Government, with the power to grant sublicenses for such purposes, is hereby granted to the Government of the United States of America.

This invention relates to a process for modifying rosins, and to the products so produced.

Further, it relates to a process for modifying rosins with photosensitized-oxidized pine gum at elevated temperatures.

The products so produced are characterized by their exceptionally high softening points, their excellent ability to maintain their color-grade, their high solution viscosities, and their great resistance to oxidation.

As contemplated in the present invention, the term "rosin" includes unmodified rosins and the polyesters of unmodified rosins. The term "unmodified rosins" comprises monocarboxylic acids containing conjugated dienic groups, and are present in gum rosin, wood rosin, and tall-oil rosin. These rosins are commercially useful in varnishes, adhesives, and the like. Because of its wide usage, the term "gum rosin" will be employed frequently below; however, this term is understood to be illustrative, and will include the wood and tall-oil rosins. They will be discussed more fully below.

Polyesters of unmodified rosin, as used herein, include the esters of polyalcohols and the rosin acids, particularly the hydrocarbon soluble esters derived from pentaerythritol and/or glycerin. These hydrocarbon soluble products are characterized by their resistance to saponification, their durability, their moisture resistance, and their freedom from livering in the presence of basic pigments.

As used herein, the term photosensitized-oxidized pine gum, referred to below as (POPG), includes a mixture of transannular peroxides and hydroperoxides, the major components being 6,14-peroxy-$\Delta^{7(8)}$-dihydroabietic acid; 7,13-peroxy-$\Delta^{7(8)}$-dihydroabietic acid; and 18-hydroperoxy-6,14-peroxy-$\Delta^{7(8)}$-dihydroabietic acid [cf. J. Am. Chem. Soc., 80, 1438 (1958); 82, 1734 (1960); and 83, 2563 (1961)]. The numbering is according to Simonsen, "The Terpenes," vol. III, p. 374 [second edition; the University Press, Cambridge (1952)]. The preparation of (POPG) is described in U.S. Patent 2,996,515 issued August 15, 1961.

The unmodified rosins have a number of commercial uses including their electric-insulation property as binding material in core oils for foundry cores, their use in the production of linoleum, and the like. However, unmodified rosins have certain disadvantages such as their acidic properties, their tendency to crystallize, their reaction with heavy metals, their tendency to oxide by atmospheric oxygen, their low softening points, and the like.

The acidic properties have been largely overcome by converting the rosin acids to their ester derivatives using various processes well known in the art. The problem of their melting or softening points has been more difficult.

Attempts have been made to increase the softening points of rosins by various processes. In one, the rosin was modified by the use of the peroxidic compound azobisisobutyronitrile. One hundred g. of gum rosin of softening point 74° C. was mixed with 2.1 g. of azobisisobutyronitrile and heated under nitrogen for four hours at 225° C. The resulting product had a softening point of 90° C. but was of color grade D (worst possible color—almost black).

The modification of the rosin with azobisisobutyronitrile did improve its softening point but it had the serious disadvantage of discoloring the modified rosin, thereby rendering it totally unacceptable for many commercial uses, such as clear surface coatings and many adhesives.

In another method, the peroxidic compound, benzoyl peroxide was used. One hundred grams of gum rosin of softening point 74° C. was mixed with six grams of benzoyl peroxide and heated for four hours at 225° C. under nitrogen. The resulting rosin had a softening point of 82° C. and color grade of F.

The modification of the rosin with benzoyl peroxide not only failed to increase the softening point of the rosin appreciably (as will be noted below in Example 8) but again had the serious disadvantage of discoloring the modified product. Further, benzoyl peroxide is expensive which also detracts from commercial acceptance where economy is essential.

Therefore, prior to the present invention there still remained a need for a commercial, suitable process for the modification of rosin and its polyester derivatives to produce products having improved softening temperatures without seriously affecting their color-grade. Such a process should be economical. It should be simple and easily carried out in presently-available commercial equipment. Such a modification should preferably be produced by the use of a product that is homogeneous with the rosin or rosin ester, thereby eliminating the need of added solvent or other foreign material. Last, but not least important, the modified rosin products should be free of extraneous materials or other impurities which might be detrimental to their use, and not degraded in color.

In general, the overall process of the present invention may be simply described. The unmodified rosin, or its polyester derivative, is subjected to the following operation. Therein all proportions and percentages are based on the weight of the rosin unless otherwise noted. Temperatures are in degrees centigrade.

(1) A reaction chamber is charged with a physical mix comprising:

(a) from about 2.0 to 40.0 weight percent (POPG), and
(b) from about 98.0 to 60.0 weight percent rosin.

(2) A blanket of an inert gas is then introduced into the reaction chamber.

(3) The physical mix is then heated to from about 120° to about 310° C. to form a hot melt. During this heating period it is also stirred, usually mechanically.

(4) The hot melt is then maintained at the required temperature under the blanket of inert gas for about 2.0 to 6.0 hours. During the heating, aliquots are withdrawn periodically and the softening point and color grade determined. At the maximum softening point consistent with the desired color grade, the reaction is stopped.

(5) Heating is then discontinued while still maintaining the hot melt under the blanket of inert gas. The melt is stirred mechanically usually by means of a mechanical stirrer throughout the entire course of the run.

(6) The cooled modified material is then recovered. The modified product is a molten liquid mass and may be recovered as granules, pellets, lumps, ribbons, etc. After cooling below its softening point, the solid may be ground to a powder.

As so described, the modification process of the present invention appears deceptively simple. However, each of the several steps is critical. Each involves certain criteria which within certain ranges must be observed. Therefore, each will be more fully discussed in relation to the problem solved thereby, as well as its place in the overall treatment. By the process, the unmodified rosin or rosin polyester is converted to a modified product having a higher softening point. Most important, less color change is imparted to the modified material. As noted above, an advantage of the present process is that it may be carried out using presently available plant equipment.

It is another advantage that the rosin may first be modified by the process of our invention and subsequently converted to a polyester derivative having an improved softeinng point without a large change in the grade of its color.

It is a still further advantage that unmodified rosins may be converted to their polyesters and the resulting rosin ester modified by the process of our invention.

It is a still further advantage that the unmodified rosin may be modified and converted to a modified polyester derivative simultaneously, as will be described more fully below.

REACTION VESSEL

Any suitable vessel or pot equipped with a lid, stirrer, inlet and outlet openings, and capable of withstanding temperatures ranging from about 120° to 310° C. may be used. Such equipment is commercially available in laboratory or plant sizes.

PREPARATION OF THE PHYSICAL MIX

The preparation of the physical mix involves two critical features: (a) choice of the rosin or polyester of the rosin to be modified; and (b) the choice of the photosensitized-oxidized pine gum (POPG).

*The rosin.*—In general, gum rosin, wood rosin, or tall-oil rosin may be used. For use in printing ink or deeply colored coatings, the color grade is less important. For varnishes and clear adhesives a gum rosin of WW (water white) or WG (water glass) grade should be employed.

*The polyester of rosin.*—The specific polyester of rosin to be modified will be determined largely by its end use and is readily selected by a person skilled in the art. Typical rosins and uses are discussed in "Polymers and Resins," B. Golding; D. Van Nostrand Co., Inc., Princeton, N.J. (1959). Polyesters of rosins which have received wide acceptance as commercial products are ester gum (the triglyceryl ester of rosin and glycerol); the pentaerythritol ester of rosin. For certain uses the glycol esters of rosin may be modified.

*Photosensitized-oxidized pine gum (POPG).*—The second critical feature in our novel process is the preparation of the (POPG). As noted above (POPG) is prepared according to U.S. Patent No. 2,996,515. In this process pine gum is dissolved in a suitable solvent, such as 95% alcohol and 5% water, and a small amount of sensitizing dye is added and the solution is blown (aerated) with air while simultaneously irradiating the solution with visible light having a wave length from about 2,000 to 7,000 A. The dye is conveniently removed from the reaction mixture by treatment with an activated charcoal (Norit-A, neutral) and filtering. After stripping the solvent under reduced pressure, the (POPG) is obtained as an off-white, friable, solid powder, which may be readily converted to a powder.

The peroxide content of the (POPG) generally amounts to 0.5–0.65 equivalent of peroxide per mole of rosin acid present or about 0.016–0.002 equivalent of peroxide per gram of (POPG).

The amount of (POPG) used on the weight of the rosin or polyesters of rosins may be varied from about 2–40 weight percent, the commercial practical amount ranging from about 8–20 weight percent.

When the physical mix comprises a polyester of rosin and (POPG), and the amount of (POPG) is greater than about eight weight percent on the weight of the polyester a corresponding molar amount of glycerol can be added to react with the carboxyl groups of the (POPG). This keeps the acid number low.

BLANKET OF INERT GAS

It is another critical feature of our invention that a good blanket of an inert gas covers the hot melt during the entire operation to prevent oxidation of the rosin and/or rosin polyester and the (POPG). Excellent results are obtained with nitrogen gas or carbon dioxide gas. Other inert gases may be used.

HEATING THE PHYSICAL MIX

The modification of the rosins and/or polyesters of rosin with (POPG) may be carried out at about 120° C. to about 310° C., the preferred temperature being about 155°–290° C. As noted above, when more than about 8% (POPG) is used, and a corresponding molar amount of glycerol is added to react with the carboxyl group of the (POPG) the temperature may range from about 225° to 290° C. At the end of the modification, a short period of steam sparging to remove any unreacted glycerol (and any other volatiles present) will generally be helpful in raising the softening point. The usual time of heating may range from about two to six hours. The preferred range is about 200°–250° C. for a reaction period of around four to six hours. When shorter reaction periods are employed, higher temperatures are required.

The preparation of high-melting ester gums by reaction of the high-melting, modified rosin with glycerol, pentaerythritol, etc., may be carried out according to procedures well known in the art. A typical process is heating the high-melting, modified rosin with the theoretical amount of glycerol plus a 10% excess, at 290° C. until the acid number has dropped to between 0–30. This is then followed by a short period of steam sparging to remove any excess glycerol and/or other volatiles which may be present.

When the modification of the unmodified rosin with (POPG) is followed in a continuous operation by the esterification of the modified product at least 10 weight percent excess of glycerol (or other alcohol) above a 1:1 molar ratio of carboxyl to alcoholic groups. Thus, for about 906 grams modified rosin 101 grams glycerol may be used. Any excess glycerol (or other polyalcohol) is subsequently removed by sparging with steam.

COMPLETION OF THE MODIFICATION

The period of dwell at the modifying temperature is controlled by removing aliquots at intervals and determining the softening point and color grade. When the maximum softening point is obtained, consistent with the color grade permissible, the heating and flow of inert gas are discontinued.

RECOVERING THE MODIFIED PRODUCT

The modified product is then cooled and recovered as noted above.

It is an advantage in the use of (POPG) in the modification of rosins and polyesters of rosins that the (POPG) is very similar in nature to the rosin itself, and is homogeneous with the rosin and/or polyesters of the rosin. Consequently, no added solvent or foreign material is required to produce homogeneity. As a result, no after-wash or any sort of subsequent treatment is necessary to remove solvent or catalyst residues after the thermal modification. Further, any chemically combined catalyst residues are rosinous in nature and thus similar to the rosinous product itself. This is not the case when other materials such as azobisisobutyronitrile is used.

Another significant advantage is that high-melting ester gums may also be prepared by heating unmodified rosin, glycerol (10% excess) and (POPG) (about 9% on the weight of the final ester) together at about 290° C. until the acid number is reduced to 0–30. Excess glycerol and volatiles are then eliminated by a short period of steam sparging. Such a process is an embodiment of our invention.

The invention will be more fully described in conjunction with the following examples which are intended as illustrative. Unless otherwise stated, all parts and percentages are by weight. Temperatures are indicated in degrees centigrade. The terms melting point and softening point are used interchangeably and refer to the ring-and-ball softening-point method described as A.S.T.M. designation: E28–51T, in the 1952 Book of ASTM Standards, page 1079 (published by A.S.T.M., Philadelphia, Pennsylvania). The commercial grades of rosin vary from X through WW (water white), WG (water glass), N, M, K, I, H, G, F, E, and D with increasing color. Grade "D" is practically black.

*Example 1*

In the following example photosensitized-oxidized pine gum (POPG) is prepared essentially according to U.S. Patent 2,996,515 and used in several of the examples below.

To 267 g. of slash pine gum dissolved in 2360 ml. of 95% ethanol is added 0.270 g. of rose bengal and the solution simultaneously aerated and irradiated with a total of 100 watts of fluorescent light (daylight bulbs) for about 21 hours. The reaction is determined to be complete by removing aliquots periodically, stripping to dryness, and titrating for peroxide content via J. Am. Chem. Soc., 83, 2563 (1961). When no further change occurs with time, the reaction is over. Then 75 g. of Norit-A (neutral), is added to the above solution, stirred for two hours, filtered, stripped under reduced pressure, and the syrup is pumped under vacuum until a dry, friable solid is obtained. The solid is crushed or pulverized to give a free-flowing, off-white powder. Analysis shows 0.55 equivalent of peroxide/mole of resin acid is present. The turpentine is unreacted and is separated from the alcohol by distillation.

*Example 2*

In the following example portions of the (POPG) prepared in the previous example are heated with an unmodified gum rosin.

A 100-gram portion of a water white (WW) gum rosin having a softening point of 74° C. is used. To this is added 17.6 g. of the (POPG) of Example 1 and the mixture is heated under a blanket of carbon dioxide for six hours at 155°–160° C. with mechanical stirring. The resulting modified rosin exhibits a ring-and-ball softening point of 93° C. and a color grade of K.

When the gum rosin is heated under generally similar conditions but the (POPG) is omitted, the softening point is only about 81° C. and the color has a grade of N.

*Example 3*

In the following example an ester gum is prepared using the modified rosin of Example 2.

Eleven grams of glycerol are added to the product prepared in Example 2 and the mixture is heated with stirring at 290° C. for six hours. The resulting modified ester gum exhibits a ball-and-ring softening point of 110° C. and is of color grade H.

When the treatment is carried out on a 500 g. batch of the modified rosin of Example 2 the color is improved, grade I resulting from the treatment.

*Example 4*

In the following example unmodified gum rosin is modified with (POPG) and converted to a modified ester gum simultaneously.

A mixture of 100 g. of WW gum rosin having a softening point of 74° C., 12 g. of glycerol, and 17.6 g. of (POPG) is reacted for 4.5 hours at 290° C. during mechanical stirring. Unreacted glycerol is then removed by steam sparging. The resulting modified ester gum exhibits a ring-and-ball softening point of 105° C., is of color grade H, and has an acid number of 19.

*Example 5*

In the following example an ester gum is modified with the (POPG).

To 100 parts of ester gum (triester of gum rosin and glycerol) of color grade N and ring-and-ball softening point of 97° C. is added 17.6 g. of (POPG). The mixture is then heated at 290° C. for two hours under a blanket of nitrogen gas during mechanical stirring. The resulting modified ester gum exhibits a ring-and-ball softening point of 111° C. and a color grade of M.

When the ester gum initially used is of color grade WG, the final product after heating with (POPG) is of color grade N.

*Example 6*

In the following example a pentaerythritol ester of unmodified gum rosin is used.

To 100 g. of the pentaerythritol ester of unmodified gum rosin having a ball-and-ring softening point of 105° C. is added 8.8 g. of (POPG) and the mixture heated three hours at 225° C. under nitrogen and during mechanical stirring. The resulting modified ester has a ball-and-ring softening point of 128° C. It will be observed that modification of the ester gum has increased the softening point 23° C.

*Example 7*

In the following example, the pentaerythritol ester of unmodified wood rosin is modified with (POPG).

To 100 g. of the pentaerythritol ester of unmodified wood rosin having a ball-and-ring softening point of 108° C. is added 8.8 g. of (POPG) and the mixture heated at 225° C. for four hours under nitrogen and with mechanical stirring. The ball-and-ring softening point of the resulting modified ester is 122° C. It will be observed that modification of the ester gum has increased the softening point 14° C.

*Example 8*

In the following example portions of the same unmodified gum rosin used in Example 2 are treated under similar temperatures and times but using various modifying agents.

A mixture of 100 g. of WW unmodified gum rosin of ball-and-ring softening point 74° C. and 8.8 g. of (POPG) is heated for six hours under nitrogen at 155° C. during mechanical stirring. The resulting modified rosin that is obtained has a ball-and-ring softening point of 89° C. and is of color grade K.

When 17.6 g. of (POPG) is used, the softening point has increased four degrees to 93° C. without further loss of color.

When no (POPG) is used, the heating gives a product of softening point 81° C. and the color grade is N.

When 2.1 g. of azobisisobutyronitrile is used, the resulting heat treated rosin is of color grade E (almost black) and softening point 87° C.

When 6 g. of benzoyl peroxide is used, the softening point is 79° C. and the color grade is G.

It will be observed that when unmodified gum rosin is treated with (POPG), the softening point is raised appreciably with less change in color than when other peroxides are used. Heat treating with azobisisobutyronitrile improves the softening point but the color is seriously affected. Heat treating with benzoyl peroxide improves the softening point only 4° C. but seriously affects the color.

*Example 9*

In the following example, the general procedure of Example 8 is repeated except the temperature of treatment is increased and the time is decreased.

To 100 g. of unmodified WW gum rosin of softening point 74° C. is added 8.8 g. of (POPG) and heated four hours at 225° C. under nitrogen and with mechanical stirring. The resulting modified rosin has a softening point of 94° C. and a color grade of H.

When no (POPG) is added the softening point is 89° C. and color grade is H.

If 2.1 g. of azobisisobutyronitrile is used, the color grade is D (worst possible color—almost black) and the softening point is 90° C.

If 6 g. of benzoyl peroxide is used, the softening point is 82° C. and color grade is F.

It will be observed that increasing the temperature of treatment when azobisisobutyronitrile or benzoyl peroxide is used has a deleterious effect on the color without appreciably improving the softening point.

*Example 10*

In this example an unmodified gum rosin having a softening point of about 75° C. is used and the procedure is generally similar to that of Example 2, except the temperature is increased and the time is decreased.

To 100 g. of unmodified gum rosin of softening point 75° C. and color grade WW is added 8.8 g. of (POPG) and heated for 2.5 hours at 290° C. under nitrogen and with mechanical stirring. The modified rosin that is obtained exhibits a ring-and-ball softening point of 92° C. and color grade K.

Heating for six hours without (POPG) gives a softening point of 81° C. and color grade M.

*Example 11*

In this example unmodified wood rosin is treated by the general procedure of Example 2 except less (POPG) is used.

To 100 g. of unmodified wood rosin of softening point 72° C. is added 8.8 g. of (POPG) and the mixture is heated at 155° C. for six hours under nitrogen and with mechanical stirring. The modified rosin obtained has a ball-and-ring softening point of 91° C.

If desired, unmodified tall-oil rosin may be substituted for the unmodified wood rosin and generally similar results are obtained.

We claim:
1. A process for modifying a rosin material selected from the group consisting of an unmodified rosin and a polyester of an unmodified rosin comprising the following steps:
   (a) charging to a reaction vessel a physical mix containing about from 98 to 60 percent of said rosin material and about from 2 to 40 percent of photosensitized-oxidized pine gum, said percentages being weight percent of the total mix;
   (b) blanketing the physical mix of step (a) with an inert gas;
   (c) heating the thus-blanketed physical mix of step (b) above its melting point;
   (d) maintaining a period of dwell of the molten product of step (c) for at least two hours and not more than about six hours under the blanket of inert gas with mechanical stirring until the maximum softening point has been obtained; and
   (e) thereafter recovering the resulting modified product.
2. The process of claim 1 wherein the rosin material is an unmodified rosin selected from the group consisting of gum rosin, wood rosin, and tall-oil rosin.
3. A product produced by the process of claim 2.
4. The process of claim 1 wherein the rosin material is a polyester of unmodified rosin selected from the group consisting of the glycerol ester of rosin and the pentaerythritol ester of rosin.
5. A product produced by the process of claim 4.
6. The process of claim 1 wherein the inert gas is selected from the group consisting of nitrogen and carbon dioxide.
7. The process of claim 1 wherein the molten mass is maintained at a temperature of about 175° C. to about 300° C.
8. A process for the preparation of a modified polyester of rosin comprising the following steps:
   (a) charging to a reaction vessel a physical mix containing about from 98 to 60 percent of an unmodified rosin selected from the group consisting of gum rosin, wood rosin, and tall-oil rosin and about from 2 to 40 percent of a photosensitized-oxidized pine gum, said percentages being weight percent of the total mix;
   (b) blanketing the physical mix of step (a) with an inert gas;
   (c) heating the thus-blanketed physical mix of step (b) above its melting point;
   (d) maintaining a period of dwell of the molten product of step (c) for at least two hours and not more than about six hours under the blanket of inert gas with mechanical stirring until the maximum softening point has been obtained;
   (e) refluxing the resultant modified rosin with an amount of a polyalcohol, selected from the group consisting of glycerol and pentaerythritol, sufficient to afford at least a 10 weight percent excess of the polyalcohol above a 1:1 molar ratio of carboxyl to alcoholic groups, until the acid number of the resulting modified polyester of rosin is less than 30;
   (f) removing any unreacted polyalcohol in step (e) by sparging with steam; and
   (g) thereafter recovering the modified polyster of rosin.
9. A process for simultaneously modifying and esterifying an unmodified rosin comprising the following steps:
   (a) charging to a reaction vessel a physical mix containing 100 parts of an unmodified rosin selected from the group consisting of gum rosin, wood rosin, and tall-oil rosin, about from 10 to 15 parts of a polyalcohol selected from the group consisting of glycerol and pentaerythritol, and about from 15 to 20 parts of photosensitized-oxidized pine gum, all parts by weight;
   (b) blanketing the physical mix of step (a) with an inert gas;
   (c) heating the thus-blanketed physical mix of step (b) to about from 270° C. to 310° C.;
   (d) maintaining a period of dwell of the molten product of step (c) at about 290° C. for about 4.5 hours until the acid number of the resulting modified polyester of rosin is less than 30;
   (e) removing any unreacted polyalcohol in step (d) by sparging with steam; and
   (f) thereafter recovering the modified polyester of rosin.

References Cited by the Examiner
UNITED STATES PATENTS

| | | | |
|---|---|---|---|
| 2,138,193 | 11/1938 | Peterson | 260—104 |
| 2,369,125 | 2/1945 | Anderson | 260—106 |
| 2,996,515 | 8/1961 | Moore | 260—99 |
| 3,106,550 | 10/1963 | Bitting | 260—104 |
| 3,230,235 | 1/1966 | Moore et al. | 260—340.3 |

LEON J. BERCOVITZ, *Primary Examiner.*
F. McKELVEY, *Assistant Examiner.*